(12) United States Patent
Gersten et al.

(10) Patent No.: US 10,875,517 B2
(45) Date of Patent: Dec. 29, 2020

(54) MANUAL TRANSMISSION FOR A HYBRID DRIVE, METHOD FOR CONTROLLING A MANUAL TRANSMISSION OF THIS TYPE, COMPUTER PROGRAM PRODUCT, CONTROL AND/OR REGULATING DEVICE, AND HYBRID DRIVE

(71) Applicant: ZF Friedrichshafen AG, Friedrichshafen (DE)

(72) Inventors: Rayk Gersten, Friedrichshafen (DE); Stefan Renner, Bodman-Ludwigshafen (DE); Johannes Kaltenbach, Friedrichshafen (DE); Johannes Glückler, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 114 days.

(21) Appl. No.: 16/095,998

(22) PCT Filed: Mar. 28, 2017

(86) PCT No.: PCT/EP2017/057258
§ 371 (c)(1),
(2) Date: Dec. 20, 2018

(87) PCT Pub. No.: WO2017/186438
PCT Pub. Date: Nov. 2, 2017

(65) Prior Publication Data
US 2019/0135261 A1    May 9, 2019

(30) Foreign Application Priority Data

Apr. 25, 2016  (DE) .................. 10 2016 206 970

(51) Int. Cl.
*F16H 37/06* (2006.01)
*B60W 10/113* (2012.01)
(Continued)

(52) U.S. Cl.
CPC .......... *B60W 10/113* (2013.01); *B60K 6/365* (2013.01); *B60K 6/48* (2013.01); *B60K 6/547* (2013.01);
(Continued)

(58) Field of Classification Search
CPC ...... F16H 2003/008; F16H 3/72; F16H 37/06; F16H 37/065; F16H 37/0806; B60W 10/113; B60K 6/48; B60K 17/28
See application file for complete search history.

(56) References Cited

U.S. PATENT DOCUMENTS 8,684,875 B2  4/2014 Kaltenbach et al.
8,961,345 B2  2/2015 Kaltenbach et al.
(Continued)

FOREIGN PATENT DOCUMENTS

DE  10 2010 043591 A1  5/2012
DE  10 2013 063 582 A1  6/2012
(Continued)

OTHER PUBLICATIONS

German Search Report Corresponding to 10 2016 206 970.5 dated Feb. 13, 2017.
(Continued)

*Primary Examiner* — Edwin A Young
(74) *Attorney, Agent, or Firm* — Davis & Bujold PLLC; Michael J. Bujold

(57) ABSTRACT

A manual transmission for a hybrid drive of a motor vehicle having transmission input shafts (1, 3) and an output shaft (2), an electric machine, and a plurality of shifting elements. The main transmission has a fourth shaft (4) and a plurality of wheel planes. A planetary transmission unit is associated with the electric machine which can be coupled to the main transmission. The planetary transmission unit has first, second and third transmission components. The plurality of
(Continued)

shifting elements are selectively engageable to produce various gear ratios between input shaft (1) and output shaft (2) and/or shaft (3) and output shaft (2). The fourth shaft (4) is coupleable to an auxiliary power take-off and, in either a standstill or a driving gear, the fourth shaft (4) is in driving connection with shaft (1) and/or shaft (3) by way of one of the wheel planes.

29 Claims, 4 Drawing Sheets

(51) Int. Cl.
| | |
|---|---|
| *B60K 6/365* | (2007.10) |
| *B60K 6/48* | (2007.10) |
| *B60K 6/547* | (2007.10) |
| *B60K 17/28* | (2006.01) |
| *B60K 25/06* | (2006.01) |
| *B60W 10/115* | (2012.01) |
| *B60W 10/30* | (2006.01) |
| *B60W 10/02* | (2006.01) |
| *B60W 30/188* | (2012.01) |
| *B60W 30/18* | (2012.01) |
| *B60W 10/08* | (2006.01) |
| *B60W 10/06* | (2006.01) |
| *B60W 20/15* | (2016.01) |

(52) U.S. Cl.
CPC .............. *B60K 17/28* (2013.01); *B60K 25/06* (2013.01); *B60W 10/02* (2013.01); *B60W 10/06* (2013.01); *B60W 10/08* (2013.01); *B60W 10/115* (2013.01); *B60W 10/30* (2013.01); *B60W 20/15* (2016.01); *B60W 30/18054* (2013.01); *B60W 30/1888* (2013.01); *B60K 2006/4816* (2013.01); *Y02T 10/62* (2013.01)

(56) References Cited

U.S. PATENT DOCUMENTS

| | | | |
|---|---|---|---|
| 9,546,721 | B2 | 1/2017 | Mittelberger et al. |
| 10,071,622 | B2 | 9/2018 | Kaltenbach |
| 2012/0116624 | A1 | 5/2012 | Reith |
| 2012/0240723 | A1* | 9/2012 | Gluckler ......... B60W 30/18127 74/661 |
| 2013/0255440 | A1* | 10/2013 | Blond .................... B60K 25/06 74/661 |
| 2014/0100072 | A1* | 4/2014 | Kaltenbach ............... F16H 3/62 475/151 |
| 2014/0150604 | A1* | 6/2014 | Kaltenbach .............. B60K 6/20 74/661 |

FOREIGN PATENT DOCUMENTS

| | | |
|---|---|---|
| DE | 10 2011 080 069 A1 | 1/2013 |
| DE | 10 2012 218 367 A1 | 4/2014 |
| DE | 10 2013 222 510 A1 | 5/2015 |
| DE | 10 2013 223 909 A1 | 5/2015 |
| JP | 2013-112073 A | 6/2013 |
| WO | 2017/076606 A1 | 5/2017 |

OTHER PUBLICATIONS

International Search Report Corresponding to PCT/EP2017/057258 dated May 29, 2017.
Written Opinion Corresponding to PCT/EP2017/057258 dated May 29, 2017.

* cited by examiner

| Condition of the fourth shaft | Shifting elements closed |||||||||
|---|---|---|---|---|---|---|---|---|---|
| | 10 | 20 | 30 | 40 | 50 | 60 | 70 | I | J |
| Standstill gear |||||||||||
| PTO 1 - E | X | | X | | | | | | X |
| PTO 2.1 | | | | X | | | | | |
| PTO 2.2 | X | | | X | | | | | X |
| PTO 2.3 | | X | | X | | | | | X |
| PTO 3.1 | | | | | X | | | | |
| PTO 3.2 | X | | | | X | | | | X |
| PTO 3.3 | | X | | | X | | | | X |
| PTO 4 - E | | X | X | | X | | | | X |
| EDP - 1 | X | | | | | | X | | |
| EDP - 2 | | X | | | | | X | | |
| Driving gear |||||||||||
| PTO 1 | X | | X | | | | X | | X |
| PTO 2 | | | | X | | | X | | X |
| PTO 3 | | | | | X | | X | | X |
| PTO 4 | | X | X | | | | X | | X |
| PTO Null | | | | | | X | | | |
| PTO 5.1 | X | | X | | | X | | | X |
| EDP 5.2 | | | | X | | X | | | X |
| EDP 5.3 | | X | X | | | X | | | X |
| PTO 5.4 | | | | | | X | X | | X |
| PTO 5.5 | X | | | | | X | | | X |
| PTO 5.6 | | X | | | | X | | | X |
| EDP - 1 | X | | | | | | X | X | |
| EDP - 2 | | X | | | | | X | X | |

Fig. 2

| Condition of the fourth shaft | Shifting elements closed | | | | | | | | | | | |
|---|---|---|---|---|---|---|---|---|---|---|---|---|
| | 10 | 20 | 30 | 40 | 50 | 60 | 70 | 80 | L | S | I | J |
| Standstill gear | | | | | | | | | | | | |
| PTO 1 - E | X | | X | | | | | | | | | X |
| PTO 2.1 | | | | X | | | | | | | | |
| PTO 2.2 | X | | | X | | | | | | | | X |
| PTO 2.3 | | X | | X | | | | | | | | X |
| PTO 3.1 | | | | | X | | | | | | | |
| PTO 3.2 | X | | | | X | | | | | | | X |
| PTO 3.3 | | X | | | X | | | | | | | X |
| PTO 4 - E | | X | X | | X | | | | | | | X |
| PTO 5.1 | | | | | | X | X | | | | | |
| PTO 5.2 | X | | | | | X | X | | | | | X |
| PTO 5.3 | | X | | | | X | X | | | | | X |
| EDP - 1 | X | | | | | | | | | | X | |
| EDP - 2 | | X | | | | | | | | | X | |
| Driving gear | | | | | | | | | | | | |
| PTO 1 | X | | X | | | | X | | [X] | [X] | | X |
| PTO 2 | | | | X | | | X | | [X] | [X] | | X |
| PTO 3 | | | | | X | | X | | [X] | [X] | | X |
| PTO 4 | | X | X | | | | X | | [X] | [X] | | X |
| PTO Null | | | | | | X | | | [X] | [X] | | |
| PTO 5.1 | X | | X | | | | X | | [X] | [X] | | X |
| EDP 5.2 | | | | X | | | X | | [X] | [X] | | X |
| EDP 5.3 | | X | X | | | | X | | [X] | [X] | | X |
| PTO 5.4 | | | | | | X | X | | [X] | [X] | | X |
| PTO 5.4.2 | | | | | | X | | X | [X] | [X] | | X |
| PTO 5.5 | X | | | | | X | | | [X] | [X] | | X |
| PTO 5.6 | | X | | | | X | | | [X] | [X] | | X |
| EDP - 1 | X | | | | | | X | | [X] | [X] | X | |
| EDP - 2 | | X | | | | | X | | [X] | [X] | X | |

Fig. 4

MANUAL TRANSMISSION FOR A HYBRID DRIVE, METHOD FOR CONTROLLING A MANUAL TRANSMISSION OF THIS TYPE, COMPUTER PROGRAM PRODUCT, CONTROL AND/OR REGULATING DEVICE, AND HYBRID DRIVE

This application is a National Stage completion of PCT/EP2017/057258 filed Mar. 28, 2017, which claims priority from German patent application serial no. 10 2016 206 970.5 filed Apr. 25, 2016.

FIELD OF THE INVENTION

The invention relates to a manual transmission for a hybrid drive, for example for a motor vehicle, having two transmission input shafts and an electric machine which is or can be brought into driving connection with one of the transmission input shafts. The invention also relates to a method for controlling such a manual transmission, a computer program product, a control and/or regulating device and a hybrid drive.

BACKGROUND OF THE INVENTION

A manual transmission for a hybrid drive is known from DE 10 2010 063 582 A1. There, the hybrid drive is formed by an internal combustion engine and an electric machine, both of them coupled to the manual transmission. For this the manual transmission has two transmission input shafts, of which one transmission input shaft is in driving connection with the internal combustion engine and the other transmission input shaft with the electric machine. The manual transmission has a countershaft gear system with a countershaft and a plurality of wheel planes coupled thereto. The manual transmission also has a plurality of shifting elements, whose selective engagement produces various gear ratios between the transmission input shaft and the transmission output shaft and/or between the further transmission input shaft and the transmission output shaft.

Such manual transmissions make it possible for two separate drives, namely an electric motor drive and for example an internal combustion engine drive, to be able both to act upon a common drive-train of a motor vehicle. This allows numerous possibilities for the further development of these manual transmissions.

SUMMARY OF THE INVENTION

Now, an embodiment of the present invention aims to extend the functional scope of a manual transmission of the type mentioned at the beginning. In addition a method for controlling such a manual transmission is proposed, and for this a computer program product and a control and/or regulating device are provided. Furthermore, a hybrid drive is proposed, which is suitable for the use of such a manual transmission and/or such a method.

This objective is achieved by a manual transmission having the features specified in the independent claims. Furthermore, the objective is achieved with a manual transmission having the features specified in the independent claims. In addition the objective is achieved by a method with the characteristics of the independent claims. To achieve the objective, in addition a computer program product a control and/or regulating device with the characteristics of the independent claims and a hybrid drive with the characteristics of the independent claims are proposed.

Advantageous design features of the invention emerge from the subordinate claims, the description given below and the figures.

According to an embodiment of the invention a manual transmission, in particular an automated manual transmission for a hybrid drive, for example for a motor vehicle, especially a utility vehicle is provided. The manual transmission has a transmission input shaft as a first shaft, a transmission output shaft as the second shaft, a further transmission input shaft as the third shaft, and an electric machine that can be or is in driving connection with the further transmission input shaft. In particular the transmission input shaft is provided in order to be brought into driving connection with a drive input machine such as an internal combustion engine.

Furthermore, the manual transmission has a main transmission with at least one fourth shaft and a plurality of wheel planes that are or can be coupled thereto. In particular, the main transmission is designed as a countershaft transmission, and the fourth shaft then constitutes the countershaft. It is also possible to provide two fourth shafts or countershafts. In such a case, by virtue of the two fourth shafts or countershafts power splitting is achieved.

In addition the manual transmission has a planetary gear transmission unit associated with the electric machine, which is or can be coupled to the main transmission, with a first transmission component, a second transmission component and a third transmission component. For example the first transmission component is a sun gear, the second transmission component is a planetary carrier, in particular a web, and the third transmission component is a ring gear. In addition a plurality of shifting elements are provided, whose selective engagement produces various gear ratios between the transmission input shaft and the transmission output shaft and/or between the further transmission input shaft and the transmission output shaft.

The manual transmission can be operated in a standstill gear in which the transmission output shaft is uncoupled, in particular the transmission output shaft is not driven. Alternatively or in addition, it is provided that the manual transmission can be operated in a driving gear in which the transmission output shaft is functionally connected to the transmission input shaft and/or to the further transmission input shaft.

In the manual transmission it is now provided that the fourth shaft has a coupling point for coupling an auxiliary power take-off. By way of the coupling point an additional consumer can be connected to the manual transmission, which is or can be mechanically driven by the transmission input shaft or a drive unit coupled thereto and/or by the electric machine. The fourth shaft of the main transmission is used for this. Thus, by virtue of the coupling point the manual transmission has an additional drive function.

It is further provided that in the standstill gear, by shifting—in particular closing or opening at least one of the shifting elements, the fourth shaft is engaged in driving connection with the transmission input shaft and/or the further transmission input shaft via one of the wheel planes of the main transmission. In that way the fourth shaft is driven in a simple manner, namely by the at least one of the wheel planes of the main transmission. The fourth shaft can be driven by the electric machine and/or by a drive unit such as an internal combustion engine coupled to the transmission input shaft.

In particular it is provided that by shifting, in particular closing or opening the at least one of the shifting elements one of the wheel planes is selected, so that by virtue of the selection of the wheel plane the drive power provided by the fourth shaft for the auxiliary power take-off is set to a desired value. Owing to the gear ratio produced by the wheel plane concerned, in this way the power provided for the fourth shaft can be determined selectively.

It is appropriate that in the standstill gear the planetary gear unit is or will be shifted to three-shaft operation, in which the transmission input shaft is or will be connected rotationally fixed to the third transmission component, the further transmission input shaft is connected rotationally fixed to the first transmission component of the planetary gear unit and the fourth shaft is or will be functionally connected to the second transmission component of the planetary gear unit. By virtue of the three-shaft operation the drive output torque of the fourth shaft can be adjusted and in particular regulated, especially regulated continuously, to a desired value by an interaction of the electric machine and a drive unit, such as an internal combustion engine, connected to the transmission input shaft. A further control variable for this that can be used is the wheel plane engaged with the fourth shaft, by the selection of which from the plurality of wheel planes available, the gear ratio can be changed.

Alternatively or in addition, it is provided that in the driving gear the fourth shaft is in driving connection, via one of the wheel planes of the main transmission, with the transmission input shaft and/or the further transmission input shaft. In that way, in the driving gear the fourth shaft is driven in a simple manner in order, by way of the coupling point, to provide a desired drive power for the auxiliary power take-off. Thus, in the driving gear both the transmission output shaft and also an auxiliary power take-off coupled to the fourth shaft is or can be driven.

It is appropriate that in the standstill gear the planetary gearset is or will be shifted to three-shaft operation, in which the transmission input shaft is or will be connected rotationally fixed to the third transmission component, the further transmission input shaft is connected rotationally fixed to the first transmission component of the planetary gearset and the fourth shaft is or will be functionally connected to the second transmission component of the planetary gear unit. By virtue of the three-shaft operation the drive output torque of the fourth shaft can be adjusted and in particular regulated, especially regulated continuously, to a desired value by an interaction of the electric machine and a drive unit such as an internal combustion engine connected to the transmission input shaft. A further control variable for this that can be used is the wheel plane engaged with the fourth shaft, by the selection of which from the plurality of wheel planes available the gear ratio can be varied.

As explained earlier, in the driving gear both the transmission output shaft and also an auxiliary power take-off coupled to the fourth shaft is or can be driven. For example this is the case when, according to one version of the invention, the driving gear is a forward gear or a reverse gear in which, via one of the wheel planes, the fourth shaft is or will be driven. Thereby, in a technically simple manner an auxiliary power take-off coupled to the fourth shaft is driven, since the drive power applied in the forward gear or reverse gear to the fourth shaft is used to drive the auxiliary power take-off as well at the same time.

In another embodiment of the invention it can be provided that the driving gear is a direct gear in which the transmission input shaft and/or the further transmission input shaft is in driving connection with the transmission output shaft while bypassing the wheel planes, so that in the direct gear, by shifting, specifically closing or opening at least one of the shifting elements, the fourth shaft is engaged and forms a driving connection with the transmission input shaft and/or the further transmission input shaft. In this way the one of the wheel planes is or will be engaged in the load path to the transmission output shaft, which is formed by the direct gear. Thus, in the direct gear both the transmission output shaft and also the auxiliary power take-off are or can be driven.

It can be provided that by shifting the at least one of the shifting elements, one of the wheel planes is selected so that by selecting the wheel plane the drive power provided by the fourth shaft for the auxiliary power take-off is set to a desired value. By virtue of the gear ratio provided by the wheel plane concerned, in this way the power provided for the, or for an, auxiliary power output coupled to the fourth shaft can be determined selectively.

For example, in the direct gear the fourth shaft is or will be engaged via that one of the wheel planes with the highest gear ratio. Thereby, the auxiliary power take-off is driven at the lowest possible rotational speed level of the fourth shaft that can be obtained with the manual transmission. If the auxiliary power take-off is a pump device, this at least enables a minimum delivery power whereby any losses are kept small.

It can also be provided that in the direct gear the fourth shaft is or will be engaged via the wheel plane with the lowest gear ratio. Thereby, the auxiliary power output is driven at the highest rotational speed that can be obtained with the manual transmission. If the auxiliary power output is a pump device, this enables the pump device to be operated with the maximum possible delivery power.

Furthermore, it can be provided that in the direct gear the fourth shaft is engaged via one of the wheel planes whose gear ratio is between that with the lowest and that with the highest gear ratio. This enables operation of the auxiliary power take-off in the range between the maximum power and the minimum power, which is brought about by the corresponding already set rotational speed.

A possible mechanical structure of the manual transmission is one in which, in relation to the main transmission, a first wheel plane, a second wheel plane, a third wheel plane, a fourth wheel plane and a fifth wheel plane, in each case with an associated fixed wheel and an associated loose wheel, in particular engaged directly or indirectly therewith, for example with interposition of at least one intermediate wheel, are provided, and the respective fixed wheel is associated with and in particular connected in a rotationally fixed manner to the fourth shaft. By virtue of the five wheel planes, specifically at most five wheel planes, the manual transmission can be made with relatively little construction effort, especially if the wheel planes are in the form of spur gear wheel planes. Inasmuch as the main transmission is a countershaft gear system, by virtue of the five wheel planes the at least one countershaft can be made of sufficient length with little construction effort. As regards the planetary gear unit, it is for example provided that the first transmission component is connected rotationally fixed to the further transmission input shaft and the second transmission component to a fifth shaft.

According to a design of the invention, in a possible interconnection of the components of the manual transmission the third wheel plane, the fourth wheel plane and the fifth wheel plane are associated with the transmission input shaft and the first wheel plane and the second wheel plane with the further transmission input shaft. For example, for this it can be provided that the first wheel plane can be coupled with the fifth shaft by means of a first shifting element and the second wheel plane by means of a second shifting element, in each case in a rotationally fixed manner, the fifth shaft can be coupled in a rotationally fixed manner by means of a third shifting element to the transmission input shaft, the third wheel plane and the fourth wheel plane can be coupled, in particular in a rotationally fixed manner, respectively by means of a fourth shifting element and by means of a fifth shifting element to the transmission input shaft, the transmission input shaft and the fifth wheel plane can be brought into functional connection, in particular connected rotationally fixed, respectively by means of a sixth shifting element and by means of a seventh shifting element to the transmission output shaft, and the transmission input shaft can be coupled by means of a first additional shifting element to the third transmission component of the planetary gear unit and the third component can be coupled by means of a second additional shifting element to a component fixed on the housing, in particular in a rotationally fixed manner in each case. By virtue of such a mechanical structure of the manual transmission and such an arrangement of its shifting elements, the standstill gear can be obtained when the sixth shifting element and the seventh shifting element are in each case open, whereby the transmission output shaft is decoupled.

According to a design of the invention, for the powering of the auxiliary power take-off it is provided that in the standstill gear the fourth shaft is in driving connection with the transmission input shaft and the further transmission input shaft, in particular using the planetary gear unit, when the first shifting element, the third shifting element and the second additional shifting element are closed or the second shifting element, the third shifting element, the fifth shifting element and the second additional shifting element are closed. In that way the fourth shaft and the auxiliary power take-off can be driven by means of the electric machine purely electrically, or by means of an internal combustion engine coupled to the transmission input shaft purely by the internal combustion engine. Thereby too, combined operation is possible, in which the fourth shaft is or will be driven by the internal combustion engine and the electric machine.

Alternatively it can be provided that to drive the auxiliary power take-off, in the standstill gear the fourth shaft is in driving connection with the transmission input shaft without any functional connection to the further transmission input shaft when the fourth shifting element or the fifth shifting element is closed and the first and second shifting elements are open. In addition, the second additional shifting element can be closed. In that way the fourth shaft and the auxiliary power take-off coupled to it can be operated exclusively by a drive unit such as an internal combustion engine coupled to the transmission input shaft.

The auxiliary power take-off can also be driven in the standstill gear if the fourth shaft is brought into driving connection with the transmission input shaft and the further transmission input shaft, in particular using the planetary gear unit, when the first shifting element, the fourth shifting element and the second additional shifting element are closed or the second shifting element, the fourth shifting element and the second additional shifting element are closed. Thereby, the fourth shaft and the auxiliary power take-off coupled to it are operated exclusively by a drive unit coupled to the transmission input shaft, such as an internal combustion engine. Moreover the fourth shaft and the auxiliary power take-off coupled to it can be operated by the drive unit coupled to the transmission input shaft with the assistance of the electric machine. When the first shifting element is closed, a slower drive of the fourth shaft is produced for the auxiliary power take-off. When the second shifting element is closed, the fourth shaft is driven at a higher speed for the auxiliary power take-off.

Alternatively, for driving the auxiliary power take-off it can be provided that in the standstill gear the fourth shaft is in driving connection with the transmission input shaft and the further transmission input shaft using the planetary gearset in three-shaft operation, when the first shifting element and the first additional shifting element are closed or the second shifting element and the first additional shifting element are closed. Thereby, the manual transmission is engaged in an electro-dynamic operating mode. In this electro-dynamic operating mode it is possible to regulate the drive torque applied to the fourth shaft and provided to the auxiliary power take-off between the electric machine and a drive unit such as an internal combustion engine coupled to the transmission input shaft, and by selecting an appropriate wheel plane to set it to a desired value. When the first shifting element is closed, a slower drive of the fourth shaft is produced for the auxiliary power take-off. When the second shifting element is closed, the fourth shaft is driven at a higher speed for the auxiliary power take-off.

For example, in the standstill gear and in the electro-dynamic operating mode it is possible for a drive unit such as an internal combustion engine coupled to the transmission input shaft to drive and thereby operate the electric machine as a generator, for example in order to charge a vehicle battery or some other electric storage device. At the same time the fourth shaft is driven by the drive unit, for example the fourth shaft and with it the auxiliary power take-off rotate slowly, with a high torque. It is also possible for both the drive unit or internal combustion engine and the electric machine to drive the fourth shaft and then, for example, the fourth shaft and the auxiliary power take-off connected thereto will rotate at a high speed.

With the mechanical structure of the manual transmission described above and the arrangement of its shifting elements, the driving gear is realized as the direct gear, since the sixth shifting element is closed. In addition the second additional shifting element can be closed. To drive the auxiliary power take-off, in a design of the invention it is provided that in the direct gear the fourth shaft is driven, since in addition the first shifting element, the third shifting element and the second additional shifting element are closed, in particular in order to bring down the fourth shaft to a relatively slow rotational speed, for example the lowest possible rotational speed level.

Alternatively, in the direct gear the fourth shaft can be driven if in addition the seventh shifting element and the second additional shifting element are closed, in particular in order to bring the fourth shaft up to a relatively high rotational speed, for example the highest possible rotational speed level. Alternatively, in the direct gear the fourth shaft can be driven when in addition the fourth shifting element and the second additional shifting element are closed or the second shifting element, the third shifting element and the second additional shifting element are closed, in particular in order to drive the fourth shaft at a rotational speed which is between the highest and the lowest possible rotational speeds.

Alternatively, in the direct gear the fourth shaft can be driven when in addition the first shifting element or the second shifting element and the second additional shifting element are closed, whereas the third shifting element is open. In this way the fourth shaft and the auxiliary power take-off coupled thereto can be driven by the electric machine. The desired rotational speed level for the fourth shaft can then be adjusted directly by way of the rotational speed of the electric machine, so that an adjustment of the power of the auxiliary power take-off as required can take place by continuous regulation of the rotational speed of the electric machine.

Alternatively, for driving the auxiliary power take-off it can be provided that in the driving gear the fourth shaft is functionally connected to the transmission output shaft and the planetary gear unit is shifted to three-shaft operation, so that the planetary gear unit is functionally connected, with the transmission input shaft, the further input shaft and via the fourth shaft, to the transmission output shaft when the first shifting element or the second shifting element, the seventh shifting element and the first additional shifting element are closed. In three-shaft operation the manual transmission is in the previously described electro-dynamic mode, in which it is possible for the drive output torque applied to the fourth shaft and provided to the auxiliary power take-off to be regulated between the electric machine and a drive unit such as an internal combustion engine coupled to the transmission input shaft, and by selecting an appropriate wheel plane to set it to a desired value, in particular adjusting it continuously.

In particular the electro-dynamic operating mode is initiated by closing the first additional shifting element, whereas the second additional shifting element is open and, furthermore, one of the wheel planes of the main transmission is engaged. By means of the one wheel plane the fourth shaft is driven, and so too therefore is the auxiliary power take-off coupled thereto. The transmission output shaft is driven by another of the wheel planes, which is used as a drive output constant.

Since the first shifting element and thus the first wheel plane or the second shifting element and thus the second wheel plane can be engaged in alternation, the drive input speed of the fourth shaft of the fourth shaft with the auxiliary power take-off coupled thereto is or can be varied. For example, in this way a choice can be made between a fast rotational speed and a slow rotational speed of the fourth shaft when the first wheel plane forms a first gear and the second wheel plane forms a fourth gear.

For example, the first shifting element is engaged and first wheel plane therefore selected for the first gear when enough electrical energy has been charged into the electric storage unit, so that the electric machine is operated more as a motor and acts to drive the fourth shaft and the transmission output shaft. In contrast, the second shifting element can be engaged and thus the second wheel plane selected for the fourth gear if too little electrical energy is charged into the storage device, so that the electric machine is operated more as a generator and charges the electric storage device.

According to a further design of the invention it is provided that the manual transmission comprises a range group that is or can be coupled to the main transmission, which range group has a planetary gearset with a first transmission component, a second transmission component and a third transmission component, wherein the first transmission component is connected rotationally fixed to a sixth shaft and the second transmission component to the transmission output shaft wherein, the transmission input shaft can be coupled by the sixth shifting element to the sixth shaft, in particular in a rotationally fixed manner, the fifth wheel plane by the seventh shifting element to the sixth shaft, the fifth wheel plane can be coupled by an eighth shifting element to the second transmission component of the planetary gearset, in particular connected in a rotationally fixed manner, the third transmission component of the planetary gearset can be coupled by a ninth shifting element to a, or to the component fixed on the housing, and the third transmission component of the planetary gearset can be coupled by a tenth shifting element to the transmission output shaft, in particular connected in a rotationally fixed manner. By virtue of the range group in combination with the main transmission a larger number of gears can be engaged. For example, with five wheel planes provided in the main transmission, the range group doubles the gears that can be engaged from five gears to ten gears. For example, the first transmission component is a sun gear, the second transmission component is a planetary carrier, in particular a web, and the third transmission component is a ring gear.

In the design of the manual transmission with the range group, the standstill gear, i.e. the decoupling of the transmission output shaft, is for example achieved by opening the sixth shifting element and the seventh shifting element and/or the eighth shifting element, or the ninth shifting element and the sixth shifting element, or the seventh shifting element or the eighth shifting element. Furthermore, in the driving gear the fourth shaft is driven when in addition the ninth shifting element or the tenth shifting element is closed. Since in relation to the range group alternatively the ninth shifting element or the tenth shifting element can be engaged, a choice is or can be made between the fast group and the slow group, and thereby the adjustment range in relation to the rotational speed of the transmission output shaft can be extended.

In this design, in the standstill gear of the manual transmission the auxiliary power take-off can be driven when the fourth shaft is in driving connection with the transmission output shaft without any functional connection with the further transmission input shaft. This is achieved when the sixth shifting element and the seventh shifting element are closed and the first, second and eighth shifting elements are open. Thereby, the fourth shaft and the auxiliary power take-off coupled thereto are operated exclusively by a drive unit such as an internal combustion engine, coupled to the transmission input shaft. At the same time, a gear ratio is obtained between the transmission input shaft and the fourth shaft, in which the fourth shaft rotates at a substantially higher rotational speed than the transmission input shaft, for example by a factor of around 2.2 to 2.5.

Further, the auxiliary power take-off can be driven in the standstill gear if the fourth shaft is in driving connection with the transmission input shaft and the further transmission input shaft, in particular using the planetary gear unit, when the first shifting element, the sixth shifting element, the seventh shifting element and the second additional shifting element are closed, or the second shifting element, the sixth shifting element the seventh shifting element and the second additional shifting element are closed. Thereby a gear ratio is obtained between the transmission input shaft and the fourth shaft, in which the fourth shaft rotates at a substantially higher rotational speed than the transmission input shaft, for example by a factor of around 2.2 to 2.5. It is possible to operate the fourth shaft and the auxiliary power take-off coupled thereto exclusively by means of a drive unit such as an internal combustion engine. Further, it is possible to operate the fourth shaft and the auxiliary power take-off coupled thereto by means of a drive unit with the support of the electric machine. If the first shifting element is closed a slower drive input of the fourth shaft is obtained, lithe second shifting element is closed a faster drive input of the fourth shaft for the auxiliary power take-off is obtained.

In this design the auxiliary power take-off can be driven in the driving gear, which is used as the direct gear, if instead of the seventh shifting element now the eighth shifting element is closed. In that case, i.e. in the direct gear, besides the sixth shifting element and the second additional shifting element, the eighth shifting element and the ninth shifting element or the tenth shifting element are additionally closed. This brings the fourth shaft to a relatively high rotational speed, for example the highest possible rotational speed level.

In each case two of the shifting elements can be made as double shifting elements. At least one of the double shifting elements can be brought to a neutral position in which the two shifting elements are open. For example, the first shifting element and the second shifting element can be combined in a double shifting element, the third and the fourth shifting elements in a double shifting element and the fifth and the sixth shifting elements in a double shifting element. The seventh and eighth shifting elements and the ninth and tenth shifting elements can also be combined in double shifting elements. Furthermore the first and second additional shifting elements can be combined in a double shifting element. All these double shifting elements can be brought to the neutral position.

The auxiliary power take-off can be fitted from the outside on the manual transmission. For this it must be provided that the coupling point provided on the fourth shaft is accessible from outside. Basically, the auxiliary power take-off can also be arranged inside the housing of the manual transmission, for example attached fixed to the fourth shaft. The auxiliary power take-off is then for example an oil pump or some other working machine. As the auxiliary power take-off, a so-termed Power Take-Off (PTO) can also be provided and can be or is coupled to the coupling point.

In a further embodiment of the invention a method for controlling a manual transmission for a hybrid drive, for example of a motor vehicle and in particular a utility vehicle is provided. The manual transmission can be the manual transmission described above in one of its embodiments described.

The manual transmission has a transmission input shaft as its first shaft, a transmission output shaft as its second shaft, a further transmission input shaft as its third shaft, and an electric machine in driving connection with the further transmission input shaft. Furthermore, the manual transmission comprises a main transmission with at least a fourth shaft and a plurality of wheel planes coupled thereto. In addition the manual transmission has a planetary gear unit which is associated with the electric machine and is or can be coupled to the main transmission, which gear unit comprises a first transmission component, a second transmission component and a third transmission component. Moreover the manual transmission has a plurality of shifting elements, whose selective engagement produces various gear ratios between the transmission input shaft and the transmission output shaft and/or between the further transmission input shaft and the transmission output shaft.

The manual transmission can be operated in a standstill gear, in which the transmission output shaft is decoupled, in particular the transmission output shaft is not driven. Alternatively or in addition, it is provided that the manual transmission can be operated in a driving gear in which the transmission output shaft is functionally connected to the transmission input shaft and/or the further transmission input shaft.

In the method, to drive an auxiliary power take-off the fourth shaft is brought into driving connection via one of the wheel planes of the main transmission with the transmission input shaft and/or the further transmission input shaft when the manual transmission is operated in the standstill gear or the driving gear. Thereby, in a technically simple manner the manual transmission is used, by means of the electric machine and/or a drive unit coupled with the transmission input shaft, in particular such as an internal combustion engine, in order to drive an auxiliary power take-off that is or can be coupled by way of the fourth shaft, while at the same time the transmission output shaft can also be driven. The auxiliary power take-off can be the auxiliary power take-off described earlier.

In addition the invention includes a computer program product with a program code, which is stored on a computer-readable medium for carrying out the method described above.

The invention also includes a control and/or regulating device with the computer program product described above.

Furthermore the invention includes a hybrid drive for a motor vehicle with the manual transmission described above and/or the computer program product described above.

Further objectives, advantages, characteristics and application possibilities of the present invention emerge from the description given below with reference to the drawings, of a number of example embodiments. In this context all the features described and/or illustrated, whether taken individually or in any rational combination, constitute the object of the invention, regardless of their inclusion in the claims or the back-references thereof.

BRIEF DESCRIPTION OF THE DRAWINGS

The figures show:

FIG. 2: A tabular overview of possible operating conditions, in which the auxiliary power take-off of the manual transmission according to FIG. 1 is or can be operated, and showing the shifting elements to be actuated for the purpose, FIG. 4: A tabular overview of possible operating conditions, in which the auxiliary power take-off of the manual transmission according to FIG. 3 is or can be operated in a standstill gear, and showing the shifting elements to be actuated for the purpose.

DETAILED DESCRIPTION OF THE PREFERRED EMBODIMENTS

Figure 1:
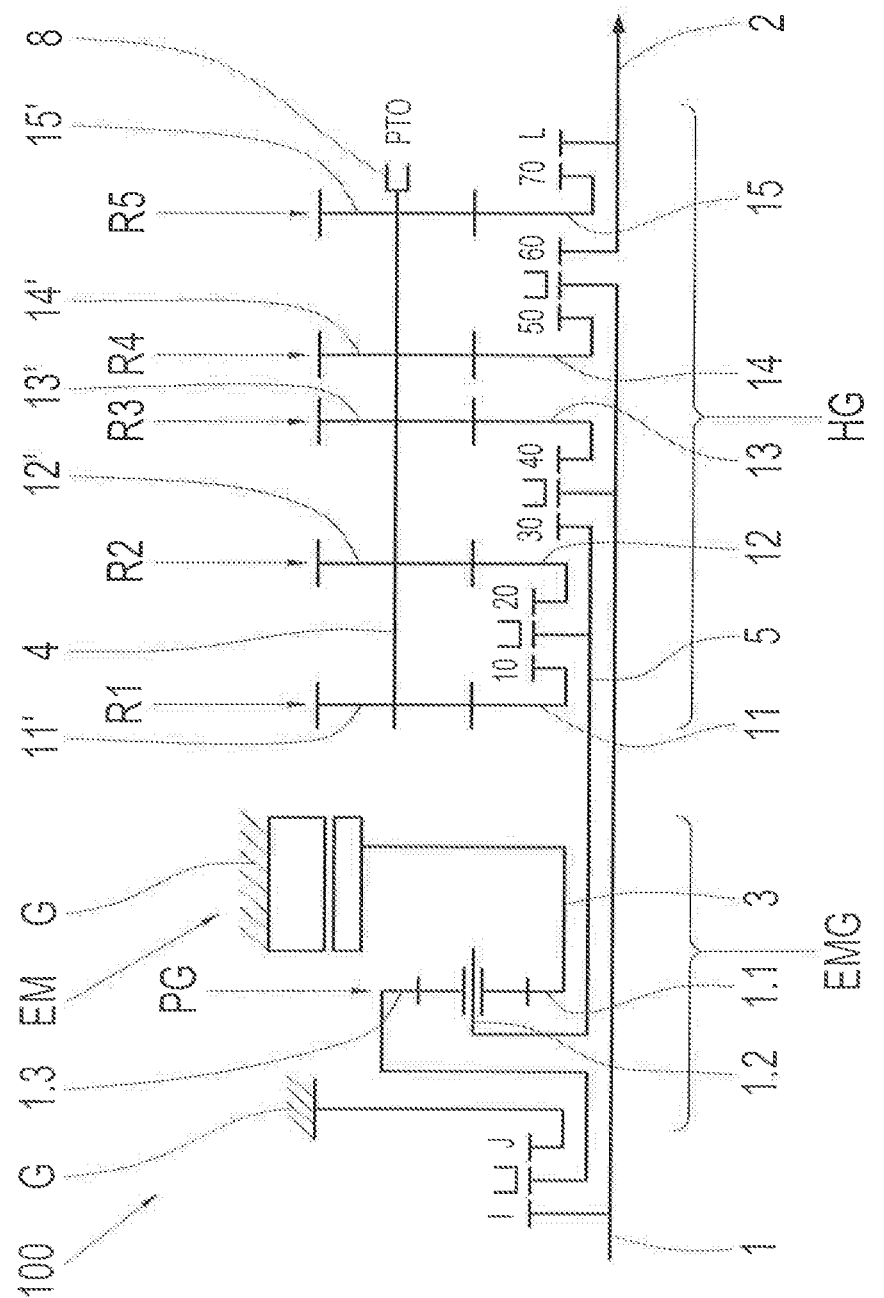
FIG. 1: A possible embodiment of a manual transmission for a hybrid drive with an electric machine, a main transmission, a planetary gear unit connected upstream from the main transmission and an auxiliary power take-off associated with the main transmission, shown schematically.

FIG. 1 shows a possible embodiment of a manual transmission 100, in particular an automated manual transmission 100, which for example can be used in or on a drive-train of a motor vehicle, in particular a utility vehicle. The manual transmission 100 is designed for a hybrid drive and has a transmission input shaft 1 as its first shaft, a transmission output shaft 2 as its second shaft, a further transmission input shaft 3 and an electric machine EM which is or can be brought into driving connection with the further transmission input shaft 3. The manual transmission 100 is or can be in driving connection with a drive unit (not shown in FIG. 1) such as an internal combustion engine, and for example can be or is connected in a rotationally fixed manner to a drive output shaft of the drive unit. The transmission input shaft 1 can be a solid shaft. The further transmission input shaft 3 can be a hollow shaft.

The manual transmission 100 has a main transmission HG with a plurality of wheel planes which preferably include a first wheel plane R1, a second wheel plane R2, a third wheel plane R3, a fourth wheel plane R4 and a fifth wheel plane R5, of which some of the wheel planes R1, R2, R3 and R4 are or can be coupled to a fourth shaft 4. For example, the main transmission HG has two sub-transmissions, of which one sub-transmission contains the first wheel plane R1 and the second wheel plane R2, while the other sub-transmission contains the third, fourth and fifth wheel planes R3, R4 and R5. For example, the fifth wheel plane R5 forms a drive output constant.

Preferably, the main transmission HG is in the form of a countershaft transmission wherein the fourth shaft 4 is a countershaft. Basically, the main transmission HG can also have two fourth shafts 4. When the main transmission HG is a countershaft transmission, the main transmission HG then has two countershafts. Preferably, the first wheel plane R1, the second wheel plane R2, the third wheel plane R3, the fourth wheel plane R4 and the fifth wheel plane R5 have at least one fixed wheel, 11', 12', 13', 14' and 15' respectively and an associated loose wheel 11, 12, 13, 14 and 15, the respective fixed wheels 11', 12'. 13', 14', 15' being associated with the fourth shaft 4, in particular connected rotationally fixed to the fourth shaft 4.

Furthermore the manual transmission 100 has a planetary gear transmission unit PG, preferably associated with the electric machine EM and preferably forming an electric machine group EMG with the electric machine EM. The planetary gear unit PG is or can be coupled to the main transmission HG. The planetary gear unit PG has a first transmission component 1.1, a second transmission component 1.2 and a third transmission come 1.3. Preferably the first transmission component 1.1 is connected rotationally fixed to the further transmission input shaft 3 and the second transmission component 1.2 to a fifth shaft 5. Preferably, the first transmission component 1.1 is a sun gear, the second transmission component 1.2 is a planetary carrier, in particular a web, and the third transmission component 1.3 is a ring gear.

In addition the manual transmission 100 has a plurality of shifting elements, preferably a first shifting element 10, a second shifting element 20, a third shifting element 30, a fourth shifting element 40, a fifth shifting element 50, a sixth shifting element 60, a seventh shifting element 70 and a first additional shifting element I and a second additional shifting element J, whose selective engagement produces various gear ratios between the transmission input shaft 1 and the transmission output shaft 2 and/or between the further transmission input shaft 3 and the transmission output shaft 2. One of the shifting elements 10, 20, 30, 40, 50, 60, 70 of the main transmission HG, for example the sixth shifting element 60, is provided in order to couple the transmission output shaft 2 to the transmission input shaft 1 while bypassing the wheel planes R1, R2, R3, R4, R5, so that then the manual transmission 100 is in a direct gear.

In detail, the shifting elements 10, 20, 30, 40, 50, 60, 70 and the additional shifting elements I and J are arranged and can be engaged as follows. By means of the first shifting element 10 the first wheel plane R1, and by means of the second shifting element 20 the second wheel plane 2, respectively, can be coupled with the fifth shaft 5, in particular connected thereto in a rotationally fixed manner. By means of the third shifting element 30, the fifth shaft 5 can be coupled, in particular connected rotationally fixed, to the transmission input shaft 1. In addition, by means of the fourth shifting element 40, the third wheel plane R3, and by means of the fifth shifting element 50 the fourth wheel plane R4, respectively, can be coupled, in particular connected rotationally fixed, to the transmission input shaft 1. In addition, the transmission input shaft 1, via the sixth switching element 60, and the fifth gear plane R5, via the seventh switching element 70, can be coupled respectively to the transmission output shaft 2, in particular rotatably connected. Furthermore, by means of the first additional shifting element I the transmission input shaft 1 can be coupled, in particular connected rotationally fixed, to the third transmission component 1.3 of the planetary gear unit PG and in turn the third transmission component 1.3 of the planetary gear unit PG can be coupled, in particular connected rotationally fixed, to a component G fixed on the housing. Preferably, the component G fixed on the housing is a component connected firmly to the housing of the manual transmission 100 or an integral part of the housing itself.

The first shifting element 10 and/or the second shifting element 20 and/or the third shifting element 30 and/or the fourth shifting element 40 and/or the fifth shifting element 50 and/or the sixth shifting element 60 and/or the seventh shifting element 70 and/or the first additional shifting element I and/or the second additional shifting element J can be in the form of unsynchronized claw-type shifting elements. As regards the first shifting element 10, the second shifting element 20, the seventh shifting element 70, the first additional shifting element I and the second additional shifting element J, synchronization can be carried out actively by means of the electric machine EM, by regulating the rotational speed of the electric machine EM. As regards the third shifting element 30, the fourth shifting element 40, the fifth shifting element 50 and the sixth shifting element 60, synchronization can be carried out actively by means of a drive unit such as an internal combustion engine coupled to the transmission input shaft 1, by regulating the rotational speed of the internal combustion engine and/or by using superimposed operation of the planetary gear unit PG. In the superimposed operation, also known as EDS operation, the first transmission component 1.1 and the third transmission component 1.3 of the planetary gear unit PG each constitute a drive input and the second transmission component 1.2 constitutes a drive output, which is produced by a superimposition of the torques and/or movements of the first transmission component 1.1 and the third transmission component 1.3.

Besides its force-transmitting function, in relation to the transmission output shaft 2 the manual transmission 100 has a further function. This function is that by means of the manual transmission 100 an auxiliary power take-off PTO is or can be driven. For this the fourth shaft 4 has a coupling point 8 to which such an auxiliary power take-off PTO can be coupled. Basically, the auxiliary power take-off PTO can even be connected permanently to the coupling point 8.

The fourth shaft 4 and thus, by way of the coupling point 8, the auxiliary power take-off PTO as well, can be driven when the manual transmission 100 is in a standstill gear. In the standstill gear the transmission output shaft 2 is decoupled. When as the manual transmission 100 is built into a vehicle, in the standstill gear the vehicle is therefore at rest or in a non-driven condition.

By engaging at least one of the shifting elements 10, 20, 30, 40, 50, 60, 70, I, J, in the standstill gear the fourth shaft 4 and therefore the auxiliary power take-off PTO is or can be engaged in driving connection with the transmission input shaft 1 and/or with the further transmission input shaft 3, so that a series of possible drive input conditions are available for the fourth shaft 4 and thus for the auxiliary power take-off PTO. The drives available are the electric machine EM coupled to the further transmission input shaft 3 and/or a drive unit such as an internal combustion engine coupled to the transmission input shaft 1.

In addition or alternatively, it can be provided that the fourth shaft 4 and thus also the auxiliary power take-off PTO connected thereto via the coupling point 8 can be driven when the manual transmission 100 is in a driving gear. In the driving gear the transmission output shaft 2 is functionally connected to the transmission input shaft 1 and/or the further transmission input shaft 3. When the manual transmission 100 is built into a vehicle, in the driving gear the vehicle is in a driving condition.

In the driving gear the fourth shaft 4 and hence too the auxiliary power take-off PTO is or can be in driving connection with the transmission input shaft 1 and/or the further transmission input shaft 3, so that a series of possible drive input conditions are available for the fourth shaft 4 and hence the auxiliary power take-off PTO. The drives available in the driving gear are the electric machine EM coupled to the further transmission shaft 3 and/or a drive unit such as an internal combustion engine coupled to the transmission input shaft 1.

FIG. 2 shows a tabular overview of possible operating conditions in which the auxiliary power take-off PTO coupled to the coupling point 8 of the fourth shaft 4 can be operated, for example operated according to choice. FIG. 2 shows the shift combinations to be produced in relation to the first shifting element 10, the second shifting element 20, the third shifting element 30, the fourth shifting element 40, the fifth shifting element 50, the sixth shifting element 60, the seventh shifting element 70, and the first additional shifting element I and the second additional shifting element J. The first column shows the various operating conditions of the fourth shaft 4 for the auxiliary power take-off PTO considered. In the following columns the position of the shifting elements 10, 20, 30, 40, 50, 60, 70, I and J are indicated, wherein crosses show that the respective shifting element 10 or 20 or 30 or 40 or 50 or 60 or 70 or I or J is in a closed position. If no cross is shown, the corresponding shifting element 10 or 20 or 30 or 40 or 50 or 60 or 70 or I or J is open.

FIG. 2 indicates various operating conditions of the fourth shaft 4 for driving the auxiliary power take-off PTO when the manual transmission 100 is in the standstill gear, in which the transmission output shaft 2 is decoupled. Such decoupling of the transmission output shaft 2 is achieved when at least the sixth shifting element 60 and the seventh shifting element 70 are each open. In the standstill gear the fourth shaft 4 and hence the auxiliary power take-off PTO can now be engaged to be driven, and the fourth shaft 4 and the auxiliary power take-off PTO can also be engaged for driving at the same time as the standstill gear is engaged.

In the operating condition shown as PTO 1-E and PTO 4-E in FIG. 2, the fourth shaft 4 and hence the auxiliary power take-off PTO are in driving connection with the transmission input shaft 1 and the further transmission input shaft 3, since the first shifting element 10, the third shifting element 30 and the second additional shifting element J are or will be closed (PTO 1-E). Alternatively, in the standstill gear the fourth shaft 4 and hence the auxiliary power take-off PTO are in driving connection with the transmission input shaft 1 and the further transmission input shaft 3 since the second shifting element 20, the third shifting element 30, the fifth shifting element 50 and the second additional shifting element J are or will be closed (PTO 4-E).

In the operating condition PTO 1-E and likewise in the operating condition PTO 4-E the fourth shaft 4 and hence the auxiliary power take-off PTO can or will in each case be driven exclusively electrically by the electric machine EM or exclusively by a drive unit such as an internal combustion engine coupled to the transmission input shaft 1. Combined operation by the electric machine EM and the drive unit coupled to the transmission input shaft 1 is also possible for driving the fourth shaft 4. The operating conditions PTO 1-E and PTO 4-E differ in that in PTO 1-E the fourth shaft 4 is driven via the first wheel plane R1 and in PTO 4-E the fourth shaft 4 is driven via the second wheel plane R2.

In the operating conditions denoted as PTO 2.1 and PTO 3.1, in the standstill gear the fourth shaft 4 is in driving connection with the transmission input shaft 1 without any functional connection to the further transmission input shaft 3, since the fourth shifting element 40 is or will be closed (PTO 2.1) or the fifth shifting element 50 is or will be closed (PTO 3.1), whereby in each case the first shifting element 10 and the second shifting element 20 are or remain open. If necessary the second additional shifting element J too is or will be closed. However, owing to the open position of the first shifting element 10 and the second shifting element 20 this has no influence on the bad path in the direction of the fourth shaft 4.

In the operating conditions PTO 2.1 and PTO 3.1, the fourth shaft 4 and hence the auxiliary power take-off PTO can or Will be driven exclusively by the drive unit such as an internal combustion engine coupled to the transmission input shaft 1. The operating condition PTO 2.1 differs from the operating condition PTO 3.1 in that in PTO 2.1 the wheel plane for engaging the second gear of the manual transmission 100, namely the third wheel plane R3 is used, by means of which the fourth shaft 4 and hence the auxiliary power take-off PTO is or will be driven. In operating condition 3.1, by closing the fifth shifting element 50 the wheel plane of the third gear, namely the fourth wheel plane R4 is used to drive the fourth shaft 4 and hence the auxiliary power take-off PTO.

In the operating conditions denoted in FIG. 2 as PTO 2.2, PTO 2.3, PTO 3.2 and PTO 3.3 the fourth shaft 4 and hence the auxiliary power take-off PTO is in driving connection with the transmission input shaft 1 and the further transmission input shaft 3, since the first shifting element 10, the fourth shifting element 40 and the second additional shifting element J are or will be closed (PTO 2.2) or the second shifting element 20, the fourth shifting element 40 and the second additional shifting element J are closed (PTO 2.3) or the first shifting element 10, the fifth shifting element 50 and the second additional shifting element J are or will be closed (PTO 3.2) or the second shifting element 20, the fifth shifting element 50 and the second additional shifting element J are or will be closed (PTO 3.3).

In the operating conditions PTO 2.2, PTO 2.3, PTO 3.2 and PTO 3.3 in each case the fourth shaft 4 and hence the auxiliary power take-off PTO can be driven exclusively by the drive unit such as an internal combustion engine coupled to the transmission input shaft 1. In these operating conditions the fourth shaft 4 and hence the auxiliary power take-off PTO too can or will be driven with the involvement of the planetary gear unit PG since the drive unit coupled to the transmission input shaft 1 is driving them and, for example, the electric machine EM is also driving in support thereof.

In this combined operating mode, by closing the first shifting element 10 (PTO 2.2, PTO 3.2) the wheel plane for the first gear, namely the first wheel plane R1, is engaged with the fourth shaft 4. Alternatively, by closing the second shifting element 20 (PTO 2.3, PTO 3.3) the wheel plane for the fourth gear, namely the second wheel plane R2 is engaged with the fourth shaft 4. Thereby, the electric machine EM is functionally connected with the fourth shaft 4. Moreover, by closing the fourth shifting element 40 (PTO 2.2, PTO 2.3) or by closing the fifth shifting element 50 (PTO 3.1, PTO 3.2, PTO 3.3) the drive unit or internal combustion engine coupled to the transmission input shaft 1 is engaged with the fourth shaft 4 by way of the third wheel plane R3 (PTO 2.2, PTO 2.3) or by way of the fourth wheel plane R4 (PTO 3.2, PTO 3.3).

In the operating conditions denoted as EDP-1 and EDP-2 in FIG. 2, in each case the fourth shaft 4 is in driving connection with the transmission input shaft 1 and with the further transmission input shaft 3, using the planetary gearset PG in three-shaft operation. For this the first shifting element 10 and the first additional shifting element I are or will be closed (EDP-1). Alternatively, the second shifting element 20 and the first additional shifting element I are or will be closed (EDP-2). In the operating conditions EDP-1 and EDP-2 electro-dynamic driving of the fourth shaft 4 and hence the auxiliary power take-off PTO takes place in the standstill gear of the manual transmission 100. This is made possible since the first additional shifting element I is or will be closed and the second additional shifting element J is open.

The transmission input shaft 1 is then connected rotationally fixed to the third transmission component 1.3 of the planetary gearset PG, so that the third transmission component 1.3 is used as the first drive input, the first transmission component 1.1 by way of the further transmission input shaft 3 as the second drive input, and the fifth shaft 5 as the output or drive output of the planetary gear unit PG. In addition the fifth shaft 5 is rotationally connected to the fourth shaft 4 via the wheel plane for the first gear, namely the first wheel plane R1 (EDP-1), or via the wheel plane for the fourth gear, namely the second wheel plane R2 (EDP-2). Within limits, the fourth shaft 4 and hence the auxiliary power take-off PTO can be adjusted, in particular continuously adjusted, to the previously described superimposed operation, by virtue of the rotational speed or torque of the drive unit coupled to the transmission input shaft 1, the rotational speed or torque of the electric machine EM and the particular wheel plane engaged with the fourth shaft 4, namely the first wheel plane R1 or the second wheel plane R2.

For example the drive unit such as an internal combustion engine connected to the transmission input shaft 1 can drive and the electric machine EM can be operated as a generator to generate electrical energy for an electric storage device. In this operating condition the auxiliary power take-off PTO rotates with a high torque but slowly. Alternatively, the drive unit connected to the transmission input shaft 1 and also the electric machine can operate in driving mode and the electric machine EM is then driven by electrical energy drawn from the electric storage device. In this case the auxiliary power take-off PTO rotates at high speed.

FIG. 2 also shows various operating conditions of the fourth shaft 4 for driving the auxiliary power take-off PTO, for cases in which the manual transmission 100 is engaged in the previously described driving gear. The driving gear can be a forward gear or a reverse gear in which the fourth shaft 4 is driven via one of the wheel planes R1, R2, R3, R4 and R5. Such a driving gear is for example the first forward gear, the second forward gear, the third forward gear, etc. In this operating condition, when the forward or reverse gear is engaged the rotational speed or torque of the fourth shaft 4 is used and picked up via the coupling point 8 in order to drive the auxiliary power take-off PTO. For this, additional actuations of shifting elements are not needed.

As examples, four such operating conditions are indicated in FIG. 2, namely PTO 1, PTO 2, PTO 3 and PTO 4. In operating condition PTO 1 the first, third and seventh shifting elements 10, 30 and 70 and the second additional shifting element J are closed. Thereby the wheel plane for the first gear, namely the first wheel plane R1 is engaged with the fourth shaft 4. In operating condition PTO 2 the fourth and seventh shifting elements 40 and 70 and the second additional shifting element J are closed. In this operating condition the wheel plane for the second gear, namely the third wheel plane R3 is engaged with the fourth shaft 4. In operating condition PTO 3 the fifth and the seventh shifting elements 50 and 70 and the second additional shifting element J are closed. In this operating condition the wheel plane for the third gear, namely the fourth wheel plane R4 is engaged with the fourth shaft 4. In operating condition PTO 4 the second, third and seventh shifting elements 20, 30 and 70 and the second additional shifting element J are closed. In this operating condition the wheel plane for the fourth gear, namely the second wheel plane R2 is engaged with the fourth shaft 4.

Further possibilities for driving the fourth shaft 4 and hence the auxiliary power take-off PTO in the driving gear of the manual transmission 100 exist for the case when the driving gear is a direct gear. In the direct gear the transmission input shaft 1 and/or the further transmission input shaft 3 is/are functionally connected to the transmission output shaft 2, bypassing the wheel planes R1, R2, R3, R4 and R5. By engaging at least one of the shifting elements 10, 20, 30, 40, 50, 60, 70, I, J the fourth shaft 4, with the formation of a driving connection with the transmission input shaft 1 and/or with the further transmission input shaft 3, is now engaged in the power path for the direct gear, or the connection of the fourth shaft 4 takes place at the same time as the engagement of the direct gear.

Thus, by engaging the at least one shifting element 10, 20, 30, 30, 50, 60, 70, I, J one of the wheel planes R1, R2, R3, R4, R5 is selected so that by selecting the wheel plane R1 or R2 or R3 or R4 or R5 the drive power provided by the fourth shaft 4 for the auxiliary power take-off PTO is or will be adjusted to a desired value. For example, in the direct gear the rotational speed of the auxiliary power take-off PTO can be varied relative to the rotational speed of a drive unit such as an internal combustion engine coupled to the drive input shaft 1. For this, a desired wheel plane that corresponds to a desired gear is engaged with the fourth shaft 4, whereby a rotational speed factor between around 0.5 and around 2.4 is produced.

Thus, to begin with the fourth shaft 4 and hence the auxiliary power take-off PTO are decoupled. In FIG. 2 this operating condition is denoted PTO Null. By virtue of the direct gear a requirement-based disengagement of the auxiliary power take-off PTO can be brought about. According to need, the fourth shaft 4 engaged in the force path of the direct gear can be decoupled without thereby abandoning the driving gear engaged, namely the direct gear. For example the fourth shaft 4 is decoupled if the seventh shifting element 70, the first additional shifting element I and the second additional shifting element J are opened. Basically it is also possible for the second additional shifting element J to be closed, since the connection formed thereby between the third transmission component 1.3 of the planetary gearset PG and the component G fixed on the housing has no influence on the direct gear.

Alternatively or in addition, the fourth shaft 4 is decoupled if the first shifting element 10 and the second shifting element 20 are open, whereas the third shifting element 30 can be closed. Alternatively the third shifting element 30 and the fourth shifting element 40 can also be open. For this case, either the first shifting element 10 or the second shifting element 20 is closed so long as the first additional shifting element I is open. In this case too the direct gear remains engaged.

In the operating condition denoted as PTO 5.1 in FIG. 2, in the direct gear the fourth shaft 4 is driven since besides the sixth shifting element 60, the first and third shifting elements 10, 30 and the second additional shifting element J are closed. In this way the fourth shaft 4 is brought to the lowest possible rotational speed level. Correspondingly, the auxiliary power take-off PTO will be or is driven at the lowest possible rotational speed. In this operating condition the auxiliary power take-off PTO is adjusted to minimal power. In the operating condition PTO 5.1 the seventh shifting element 70 is open.

In the operating condition denoted as PTO 5.4 in FIG. 2, in the direct gear the fourth shaft 4 is driven since besides the sixth shifting element 60, the seventh shifting element 70 and the second additional shifting element J are also closed. In this case the first, second, third and fourth shifting elements 10, 20, 30 and 40 are all open. Thereby the fourth shaft 4 is set to the highest possible rotational speed level. The auxiliary power take-off PTO is driven at the highest possible rotational speed, so that the auxiliary power take-off PTO is adjusted to maximum power.

In the operating condition denoted as PTO 5.2 in FIG. 2, in the direct gear the fourth shaft 4 is driven since besides the sixth shifting element 60, the fourth shifting element 40 and the second additional shifting element J are closed. In the operating condition denoted as PTO 5.3 in FIG. 2, in the direct gear the fourth shaft 4 is driven since besides the sixth shifting element 60, the second, third and second additional shifting elements 20, 30 and J are also closed. The operating conditions PTO 5.2 and PTO 5.3 are further adjustable operating conditions for the fourth shaft 4 and the auxiliary power take-off PTO, in which the rotational speed level is between the rotational speed levels of the operating conditions PTO 5.1 and PTO 5.4. By virtue of the operating condition PTO 5.2 and the operating condition PTO 5.3, further gradations are obtained by means of which the adjustability of the rotational speed level is extended for driving the auxiliary power take-off PTO.

In the operating conditions PTO 5.1, PTO 5.2, PTO 5.3 and PTO 5.4 the auxiliary power take-off PTO is in each case connected into a force flow that acts on the transmission output shaft 2. In addition, in the manual transmission 100 it is also possible optionally to engage the auxiliary power take-off PTO in a force flow produced exclusively by the electric machine E. The auxiliary power take-off PTO is then driven exclusively by the electric machine EM. This is achieved by the operating conditions denoted as PTO 5.5 and PTO 5.6 in FIG. 2. The fourth shaft 4 is driven when besides the sixth shifting element 60, the first shifting element 10 and the second additional shifting element J (PTO 5.5) or the second shifting element 20 and the second additional shifting element J (PTO 5.6) are closed, whereas the third shifting element 30 is open. In the operating conditions PTO 5.5 and PTO 5.6 the desired rotational speed level for driving the auxiliary power take-off PTO is adjusted exclusively via the rotational speed of the electric machine EM.

To drive the fourth shaft 4 and the auxiliary power take-off PTO, as already described for the standstill gear electro-dynamic operation is also possible in the driving gear. In the driving gear the fourth shaft 4 and the transmission output shaft 2 are functionally connected and the planetary gear unit PG is shifted to three-shaft operation, so that the planetary gear unit PG is functionally connected to the transmission input shaft 1, the further transmission input shaft 3 and via the fourth shaft 4 to the transmission output shaft 2. The operating conditions that can be obtained with the manual transmission 100 for this are denoted in FIG. 2 as EDP-1 and EDP-2. When the manual transmission 100 is built into a vehicle, then with EDP-1 and EDP-2 the vehicle is in electro-dynamic driving mode and can for example carry out maneuvering or crawling.

In the operating condition EDP-1 the seventh shifting element 70 and the first additional shifting element I, and furthermore the first shifting element 10 are closed, whereas the second shifting element 20 is open. In the operating condition EDP-2 the seventh shifting element 70 and the first additional shifting element I, and furthermore the second shifting element 20 are closed, whereas the first shifting element 10 is open. In the operating conditions EDP-1 and EP-2 the third transmission component 1.3 of the planetary gear unit PG is connected rotationally fixed to the transmission input shaft 1 by the first additional shifting element I, so that the third transmission component 1.3 is used as a first drive and the first transmission component 1.1 of the planetary gear unit PG is used as a second drive, which is connected rotationally fixed to the electric machine EM by way of the further transmission input shaft 3. The second transmission component 1.2 of the planetary gear unit PG is used as the drive output, which acts to drive the fourth shaft 4 by way of the fifth shaft 5 with one of the engaged wheel planes and the engaged wheel plane R1 or R2. The drive input speed of the auxiliary power take-off PTO, i.e. the rotational speed of the fourth shaft 4, now depends on the rotation rate or speed of the transmission output shaft 2 but can be changed by selecting the first wheel plane R1 or the second wheel plane R2 of the main transmission HG, from slow (second wheel plane R2) to fast (first wheel plane R1). As regards the electric machine EM, in this case it is possible to adjust its operating mode by selecting the gear step or wheel plane, the rotational speed and power of the drive coupled to the transmission input shaft, as a function of the speed of the transmission output shaft and the desired input power for the auxiliary power take-off PTO.

In as much as the achievable rotational speed of the auxiliary power take-off PTO is predetermined, by choosing the first shifting element 10 instead of the second shifting element 20 it can be selectively specified whether the electric machine EM is or will be operated as a motor or as a generator. The first shifting element 10 is closed when enough electrical energy is supplied to the electric machine EM to operate it. The second shifting element 20 is closed when too lithe electrical energy is supplied to the electric machine EM. The electric machine EM is then operated as a generator and driven by the drive unit coupled to the transmission input shaft 1 in order to charge the electric storage device with electrical energy for the electric machine again.

Figure 3:
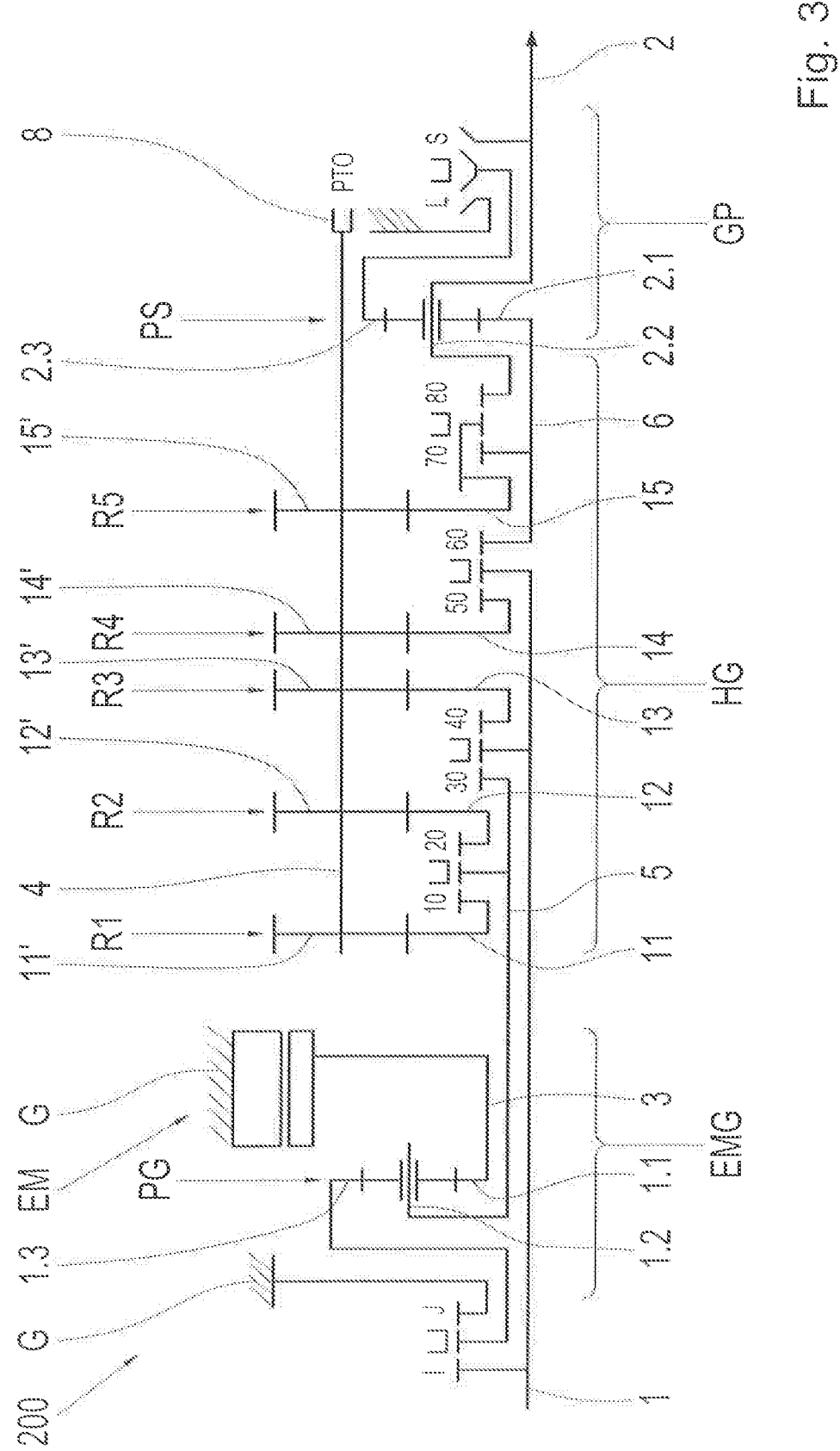
FIG. 3: A variant of the manual transmission according to FIG. 1, with an additional range group, shown schematically.

FIG. 3 shows a further embodiment of a manual transmission 200 for a hybrid drive, for example of a motor vehicle, which is a variant of the manual transmission 100 according to FIG. 1, Components of the manual transmission 200 which are identical or functionally equivalent to components of the manual transmission 100 of FIG. 1 are given the same indexes and accordingly reference should be made to the description of the manual transmission 100 of FIG. 1.

The manual transmission 200 according to FIG. 3 differs from the manual transmission 100 of FIG. 1, inter alia in that it comprises a range group GP that is or can be coupled with the main transmission HG. The range group GP has at least one planetary gearset PS with a first transmission component 2.1, a second transmission component 2.2 and a third transmission component 2.3. Preferably, the first transmission component 2.1 is a sun gear, the second transmission component 2.2 is a planetary carrier, in particular a web, and the third transmission component 2.3 is a ring gear.

It is provided that the first transmission component 2.1 is connected in a rotationally fixed manner to a sixth shaft 6 and the second transmission component 2.2 to the transmission output shaft 2. It is further provided that the transmission input shaft 1 can be connected, in particular rotationally fixed, to the sixth shaft by means of the sixth shifting element 60, the fifth wheel plane R5 can be coupled to the sixth shaft 6 by means of the seventh shifting element 70, the fifth wheel plane R5 can be coupled to the second transmission component 2.2 of the planetary gearset PS by means of an eighth shifting element 80, in particular connected rotationally fixed thereto, the third transmission component 2.3 of the planetary gearset PS can be coupled to a component, or to the component G fixed on the housing by means of a ninth shifting element L. and the third transmission component 2.3 of the planetary gearset PS can be coupled, in particular connected in a rotationally fixed manner, to the transmission output shaft 2 by means of a tenth shifting element S.

By means of the eighth shifting element 80, the ninth shifting element L and the tenth shifting element S the planetary gearset PS can be operated in a superimposed mode in which the first transmission component 2.1 and the third transmission component 2.3 of the planetary gearset PS each constitute a drive input and the second transmission component 2.2 constitutes the drive output produced by a superimposition of the torques and/or movements of the first transmission component 2.1 and the third transmission component 2.3. For this, for example at least the sixth shifting element 60 and the eighth shifting element 80 have to be closed. Thus, according to need the manual transmission 200 can be shifted into gears in which the planetary gearset PS is operated without superimposition or operated with superimposition. By shifting the planetary gearset PS into operation with superimposition further gear steps can be produced.

Preferably, the eighth shifting element 80 is in the form of an unsynchronized claw-type shifting element. As in the manual transmission 100, so too in the manual transmission 200 synchronization by means of the electric machine EM can be carried out actively, in that a rotational speed regulation of the electric machine EM is or will be used. For this, in addition to the first shifting element 10, the second shifting element 20, the seventh shifting element 70, the first additional shifting element I and the second additional shifting element J, the eighth shifting element 80 is also used. Preferably, the ninth shifting element L and/or the tenth shifting element S are in the form of synchronized shifting elements.

In the manual transmission 200 the standstill gear is obtained for example by opening the sixth shifting element 60 and the seventh shifting element 70 and/or the eighth shifting element 80, or for example by opening the ninth shifting element L and the sixth shifting element 60 or the seventh shifting demerit 70 or the eighth shifting element 80. This results in the decoupling of the transmission output shaft 2 required for the standstill gear.

FIG. 4 shows a tabular overview of possible operating conditions in which the auxiliary power take-off PTO coupled to the coupling point 8 of the fourth shaft 4 can be operated, for example operated optionally. FIG. 4 is structured identically to FIG. 2, but extended to show the eighth shifting element 80, the ninth shifting element L and the tenth shifting element S.

The operating conditions of the fourth shaft explained earlier with reference to FIG. 2, in which the auxiliary power take-off PTO can be operated in the standstill gear of the manual transmission 100, can also be produced in an identical manner in the manual transmission 200 according to FIG. 3. For this, the eighth shifting element 80, the ninth shifting element L and the tenth shifting element S provided additionally compared with the manual transmission 100 can remain open, so that the transmission output shaft 2 is decoupled.

The manual transmission 200 in its standstill gear also enables the operating conditions denoted as PTO 5.1, PTO 5.2 and PTO 5.3 in FIG. 4. In operating condition PTO 5.1 the fourth shaft 4 and hence the auxiliary power take-off PTO are in driving connection with the transmission input shaft 1 without any functional connection with the further transmission input shaft 3, since the sixth shifting element 60 and the seventh shifting element 70 are or will be closed and the first shifting element 10, the second shifting element 20 and the eighth shifting element 80 are or will be open. If necessary the second additional shifting element J is or will be closed, although due to the open position of the first shifting element 10 and the second shifting element 20 the closing of the additional shifting element J has no effect on the engaged load path in PTO 5.1. In this operating condition the fourth shaft 4 and hence the auxiliary power take-off PTO can be driven exclusively by way of the transmission input shaft 1 and by a, or by the drive unit such as an internal combustion engine connected thereto. For this the wheel plane for the fifth gear, namely the fifth wheel plane R5 is used, which in the manual transmission 100 can serve as a drive output constant. In the operating condition PTO 5.1 the fifth wheel plane R5 then serves as a drive input constant in relation to the fourth shaft 4. In operating condition PTO 5.1, in the standstill gear of the manual transmission 100 a gear ratio with a large rotational speed boost, for example by a factor of around 2.4, is obtained between the transmission input shaft 1 and the fourth shaft 4.

In addition, by way of the further transmission input shaft 3 the electric machine EM too can act upon the fourth shaft 4 and hence the auxiliary power take-off PTO. This is indicated in the operating conditions PTO 5.2 and PTO 5.3 of FIG. 4. In the operating conditions PTO 5.2 and PTO 5.3 the fourth shaft 4 is in driving connection with the transmission input shaft 1 and the further transmission input shaft 3 using the planetary gearset PG. For that, the first shifting element 10, the sixth shifting element 60, the seventh shifting element 70 and the second additional shifting element J are or will be closed (PTO 5.2). Alternatively, this can also be obtained by closing the second shifting element 20, the sixth shifting element 60, the seventh shifting element 70 and the second additional shifting element J (PTO 5.3). In PTO 5.2 and PTO 5.3 the eighth shifting element 80 remains open.

To drive the auxiliary power take-off PTO in the driving gear of the manual transmission 200 the operating conditions of the fourth shaft 4 described in FIG. 2 can also be produced in the manual transmission 200 according to FIG. 3. As regards the operating conditions PTO 1, PTO 2, PTO 3 and PTO 4, in the manual transmission 200 according to FIG. 3, in addition either the ninth shifting element L or the tenth shifting element S is or will be closed, depending on whether the slow group (ninth shifting element L) or the fast group (tenth shifting element S) is to be engaged. In FIG. 4, for the sake of simplicity both the ninth shifting element L and the tenth shifting element S are marked "[X]" to indicate that either the ninth shifting element L or the tenth shifting element S is closed. The same applies to the operating conditions of the fourth shaft 4 in the direct gear as the driving gear (PTO Null, PTO 5.1, PTO 5.2, PTO 5,3, PTO 5.4.1, PTO 5.4.2, PTO 5.5, PTO 5.6).

Compared with the manual transmission 100 according to FIG. 1, in the manual transmission 200 according to FIG. 3 the fourth shaft 4 can be operated in operating condition PTO 5.4.2 as an alternative to operating condition 5.4. In this operating condition PTO 5.4.2 the fourth shaft 4 is driven, since besides the sixth shifting element 60, the eighth shifting element 80 and the second additional shifting element J are or will be closed in order to drive the auxiliary power take-off PTO with maximum power. In relation to the operating conditions EDP-1 and EDP-2 as well, in which the auxiliary power take-off PTO is driven electro-dynamically, by virtue of the additional rang: group GP in the manual transmission 200 either the ninth shifting element L or the tenth shifting element S is closed, depending on whether the driving gear considered is to be in the slow group or in the fast group.

INDEXES

1 Transmission input shaft (first shaft)
2 Transmission output shaft (second shaft)
3 Further transmission input shaft (third shaft)
4 Fourth shaft
5 Fifth shaft
6 Sixth shaft
8 Coupling point
HG Main transmission
GP Range group
EMG Electric machine group
EM Electric machine
PTO Auxiliary power take-off
PG Planetary gear transmission unit
PS Planetary gearset
1.1 First transmission component
1.2 Second transmission component
1.3 Third transmission component
2.1 First transmission component
2.2 Second transmission component
2.3 Third transmission connect
R1 First wheel plane
R2 Second wheel plane
R3 Third wheel plane
R4 Fourth wheel plane
R5 Fifth wheel plane
11 First loose wheel
12 Second loose wheel
13 Third loose wheel
14 Fourth loose wheel
15 Fifth loose wheel
11' First fixed wheel
12' Second fixed wheel
13' Third fixed wheel
14' Fourth fixed wheel
15' Fifth fixed wheel
10 First shifting element
20 Second shifting element
30 Third shifting element
40 Fourth shifting element
50 Fifth shifting element
60 Sixth shifting element
70 Seventh shifting element
80 Eighth shifting element
L Ninth shifting element
S Tenth shifting element
I First additional shifting element
J Second additional shifting element
100 Manual transmission
200 Manual transmission
G Housing, component fixed on the housing

The invention claimed is:

1. A manual transmission for a hybrid drive in a motor vehicle, the manual transmission comprising:
   first, second and third shafts, the first shaft being a transmission input shaft, the second shaft being a transmission output shaft, the third shaft being a further transmission input shaft,
   an electric machine being drivingly connectable with the further transmission input shaft,
   a main transmission comprising at least one fourth shaft and a plurality of wheel planes coupled to the at least one fourth shaft,
   a planetary gear transmission unit which is associated with the electric machine and which is coupleable to the main transmission, the planetary gear transmission unit comprising a first transmission component, a second transmission component and a third transmission component,
   a plurality of shifting elements whose selective engagement producing various gear ratios at least one of:
      between the transmission input shaft and the transmission output shaft, and
      between the further transmission input shaft and the transmission output shaft,
   such that the manual transmission being operable in a standstill gear in which the transmission output shaft is decoupled, and
      the fourth shaft having a coupling point for an auxiliary power take-off, and, in the standstill gear, at least one of the transmission input shaft and the further transmission input shaft is drivingly connected with the fourth shaft, by shifting at least one of the plurality of shifting elements, by way of one of the plurality of wheel planes of the main transmission.

2. The manual transmission according to claim 1, wherein by shifting the at least one of the shifting elements, one of the plurality of wheel planes is selected so that, by virtue of the selection of the one of the plurality of wheel planes, drive power provided, via the fourth shaft, to the auxiliary power take-off is set to a desired value.

3. The manual transmission according to claim 1, wherein, in the standstill gear, the planetary gear transmission unit is shifted to three-shaft operation in which the transmission input shaft is connected in a rotationally fixed manner to the third transmission component and the further transmission input shaft is connected in a rotationally fixed manner to the first transmission component of the planetary gear transmission unit, and the fourth shaft is functionally connected to the second transmission component of the planetary gear transmission unit.

4. The manual transmission according to claim 1, wherein by selective engagement of the plurality of shifting elements, the manual transmission is operable in a driving gear in which the transmission output shaft is functionally connected to at least one of the transmission input shaft and the further transmission input shaft, and, in the driving gear, the fourth shaft is drivingly connected by way of one of the plurality of wheel planes of the main transmission with at least one of the transmission input shaft and the further transmission input shaft.

5. The manual transmission according to claim 4, wherein, in the driving gear, the planetary gear transmission unit is shifted to three-shaft operation in which the third transmission component is connected in a rotationally fixed manner to the transmission input shaft, the further transmission input shaft is connected in a rotationally fixed manner to the first transmission component of the planetary gear transmission unit, and the fourth shaft is functionally connected to the second transmission component of the planetary gear transmission unit.

6. The manual transmission according to claim 4, wherein the driving gear is either a forward gear or a reverse gear in which the fourth shaft is driven by way of one of the plurality of wheel planes.

7. The manual transmission according to claim 4, wherein the driving gear is a direct gear in which at least one of the transmission input shaft and the further transmission input shaft is functionally connected to the transmission output shaft, bypassing the plurality of wheel planes, such that in the direct gear, by engaging at least one of the plurality of shifting elements, the fourth shaft is engaged with at least one of the transmission input shaft and the further transmission input shaft, forming a driving connection therewith.

8. The manual transmission according to claim 7, wherein by engaging the at least one of the plurality of shifting elements, one of the plurality of wheel planes is selected such that, by the selection of the wheel plane, drive power provided by the fourth shaft for the auxiliary power take-off is set to a desired value.

9. The manual transmission according to claim 7, wherein, in the direct gear, the fourth shaft is engaged by way of a wheel plane having a highest gear ratio.

10. The manual transmission according to claim 7, wherein, in the direct gear, the fourth shaft is engaged by way of a wheel plane having a lowest gear ratio.

11. The manual transmission according to claim 7, wherein, in the direct gear, the fourth shaft is engaged by way of one of the wheel planes whose gear ratio is between a wheel plane having a lowest gear ratio and a wheel plane having a highest gear ratio.

12. The manual transmission according to claim 1, wherein
the plurality of wheel planes of the main transmission comprises a first wheel plane, a second wheel plane, a third wheel plane, a fourth wheel plane and a fifth wheel plane,
each of the first, the second, the third, the fourth and the fifth wheel planes comprises at least one fixed wheel, which is connected in a rotationally fixed manner to the fourth shaft, and an associated loose wheel,
referring to the planetary gear transmission unit, the first transmission component is connected in a rotationally fixed manner to the further transmission input shaft, and the second transmission component is connected in a rotationally fixed manner to a fifth shaft such that, the first wheel plane is couplable by a first shifting element and the second wheel plane is couplable by a second shifting element, respectively, to the fifth shaft, the fifth shaft is couplable by a third shifting element to the transmission input shaft, the third wheel plane is couplable by a fourth shifting element and the fourth wheel plane is couplable by a fifth shifting element, respectively, to the transmission input shaft, the transmission input shaft is functionally connectable by a sixth shifting element and the fifth wheel plane is functionally connectable by a seventh shifting element, respectively, with the transmission output shaft, and the transmission input shaft is couplable by a first additional shifting element to the third transmission component of the planetary gear unit, and the third transmission component is couplable by a second additional shifting element to a component fixed to a housing.

13. The manual transmission according to claim 12, wherein, in the standstill gear, the sixth shifting element and the seventh shifting element are each disengaged so that the transmission output shaft is decoupled.

14. The manual transmission according to claim 12, wherein, in the standstill gear, the fourth shaft is in driving connection with the transmission input shaft and with the further transmission input shaft, since either:
the first shifting element, the third shifting element and the second additional shifting element are engaged; or
the second shifting element, the third shifting element, the fifth shifting element and the second additional shifting element are engaged.

15. The manual transmission according to claim 12, wherein, in the standstill gear, either the fourth shifting element or the fifth shifting element is engaged and the first shifting element and the second shifting element are disengaged so that the fourth shaft is in driving connection with the transmission input shaft and is functionally disconnected from the further transmission input shaft.

16. The manual transmission according to claim 12, wherein, in the standstill gear, one of:
the first shifting element, the fourth shifting element and the second additional shifting element are engaged;
the second shifting element, the fourth shifting element and the second additional shifting element are engaged;
the first shifting element, the fifth shifting element and the second additional shifting element are engaged; and
the second shifting element, the fifth shifting element and the second additional shifting element are engaged,
so that the fourth shaft is in driving connection with the transmission input shaft and with the further transmission input shaft.

17. The manual transmission according to claim 12, wherein, in the standstill gear, either the first shifting element and the first additional shifting element are engaged or the second shifting element and the first additional shifting element are engaged so that the fourth shaft is in driving connection with the transmission input shaft and the further transmission input shaft, using the planetary gear transmission unit in three-shaft operation.

18. The manual transmission according to claim 12, wherein the sixth shifting element is engaged in a direct gear.

19. The manual transmission according to claim 18, wherein, in the direct gear, the fourth shaft is driven since in addition one of:
the first shifting element, the third shifting element and the second additional shifting element are engaged;

the seventh shifting element and the second additional shifting element are engaged;
the fourth shifting element and the second additional shifting element are engaged;
the second shifting element, the third shifting element and the second additional shifting element are engaged; and
when the third shifting element is disengaged, either the first shifting element or the second shifting element, and the second additional shifting element are engaged.

20. The manual transmission according to claim 12, wherein, in a driving gear, the fourth shaft is functionally connected to the transmission output shaft and the planetary gear transmission unit is shifted to three-shaft operation, such that the planetary gear transmission unit is functionally connected to the transmission input shaft, the further transmission input shaft and, by way of the fourth shaft, to the transmission output shaft, since either the first shifting element or the second shifting element, the seventh shifting element and the first additional shifting element are engaged.

21. The manual transmission according to claim 1, wherein
the plurality of wheel planes of the main transmission comprises a first wheel plane, a second wheel plane, a third wheel plane, a fourth wheel plane and a fifth wheel plane,
the plurality of shifting elements comprises first, second, third, fourth, fifth, sixth, seventh, eighth, ninth and tenth shifting elements,
the manual transmission has a range group that is couplable to the main transmission, the range group has at least one planetary gearset with a first transmission component, a second transmission component and a third transmission component,
the first transmission component of the planetary gearset is connected in a rotationally fixed manner to an additional shaft and the second transmission component is connected in a rotationally fixed manner to the transmission output shaft,
the transmission input shaft is couplable to the additional shaft by way of the sixth shifting element,
the fifth wheel plane is couplable to the additional shaft by way of the seventh shifting element,
the fifth wheel plane is couplable to the second transmission component of the planetary gearset by way of the eighth shifting element,
the third transmission component of the planetary gearset is couplable to a component fixed to a housing by way of the ninth shifting element, and
the third transmission component of the planetary gearset is couplable to the transmission output shaft by way of the tenth shifting element.

22. The manual transmission according to claim 21, wherein, in the standstill gear, the transmission output shaft is decoupled since one of:
at least one of the sixth shifting element and the seventh shifting element and the eighth shifting element are disengaged;
the ninth shifting element and the sixth shifting element are disengaged; and
either the seventh shifting element or the eighth shifting element are disengaged.

23. The manual transmission according to claim 21, wherein, in the standstill gear, the sixth shifting element and the seventh shifting element are engaged and the first shifting element, the second shifting element and the eighth shifting element are disengaged so that the fourth shaft is in driving connection with the transmission input shaft and is functionally disconnected with the further transmission input shaft.

24. The manual transmission according to claim 21, wherein, in the standstill gear, either:
the first shifting element, the sixth shifting element, the seventh shifting element and an eleventh shifting element are engaged, or
the second shifting element, the sixth shifting element, the seventh shifting element and the eleventh shifting element are engaged,
so that the fourth shaft is in driving connection with the transmission input shaft and the further transmission input shaft, via the planetary gear transmission unit.

25. The manual transmission according to claim 21, wherein, in a driving gear in a form of a direct gear, the sixth shifting element is engaged and, in addition, either the ninth shifting element or the tenth shifting element is engaged so that the fourth shaft is driven.

26. A method for controlling a manual transmission for a hybrid drive of a motor vehicle having first, second and third shafts, the first shaft being a transmission input shaft, the second shaft being a transmission output shaft, the third shaft being a further transmission input shaft, an electric machine which is drivingly connectable with the further transmission input shaft, a main transmission comprising at least one fourth shaft and a plurality of wheel planes coupled to the at least one fourth shaft, a planetary gear transmission unit which is associated with the electric machine and which is coupleable to the main transmission, the planetary gear transmission unit comprising a first transmission component, a second transmission component and a third transmission component, a plurality of shifting elements whose selective engagement produces various gear ratios at least one of between the transmission input shaft and the transmission output shaft, and between the further transmission input shaft and the transmission output shaft, such that the manual transmission is operable in at least one of a standstill gear in which the transmission output shaft is decoupled, and, a driving gear, in which the transmission output shaft is functionally connected to at least one of the transmission input shaft and to the further transmission input shaft, the method comprising:
driving an auxiliary power take-off, while the manual transmission is operated in either the standstill gear or the driving gear by coupling the fourth shaft into a driving connection with at least one of the transmission input shaft and the further transmission input shaft by way of one of the plurality of wheel planes of the main transmission.

27. A computer program product with a program code stored on a computer-readable medium, for carrying out the method according to claim 26.

28. At least one of a control and a regulating device in combination with the computer program product according to claim 27.

29. A hybrid drive for a motor vehicle with at least one of a manual transmission and a computer program product with a program code stored on a computer-readable medium, for carrying out a method of controlling the manual transmission,
the manual transmission having first, second and third shafts, the first shaft being a transmission input shaft, the second shaft being a transmission output shaft, the third shaft being a further transmission input shaft, an electric machine which is drivingly connectable with the further transmission input shaft, a main transmission comprising at least one fourth shaft and a plurality of wheel planes coupled to the at least one fourth shaft, a planetary gear transmission unit which is associated with the electric machine and which is coupleable to the main transmission, the planetary gear transmission unit comprising a first transmission component, a second transmission component and a third transmission component, a plurality of shifting elements whose selective engagement produces various gear ratios at least one of between the transmission input shaft and the transmission output shaft and between the further transmission input shaft and the transmission output shaft, such that the manual transmission is operable in a standstill gear in which the transmission output shaft is decoupled, the fourth shaft has a coupling point for an auxiliary power take-off, and, in the standstill gear, by shifting at least one of the plurality of shifting elements the fourth shaft is drivingly connected to at least one of the transmission input shaft and the further transmission input shaft by way of one of the plurality of wheel planes of the main transmission, and computer program product controlling driving of the auxiliary power take-off, while the manual transmission is operated in either the standstill gear or a driving gear by coupling the fourth shaft into a driving connection with at least one of the transmission input shaft and the further transmission input shaft by way of one of the plurality of wheel planes of the main transmission.

* * * * *